United States Patent [19]

Eskandry et al.

[11] Patent Number: 4,838,335
[45] Date of Patent: Jun. 13, 1989

[54] AUTOMOBILE WINDOW SHADE CONVERTIBLE TO HORIZONTAL EXPANSION OR VERTICAL EXPANSION

[76] Inventors: Ezra D. Eskandry, 1925 Brickell Ave., D901, Miami, Fla. 33131; Eli Weinberg, 13367 SW. 4th La., Miami, Fla. 33175

[21] Appl. No.: 266,068
[22] Filed: Nov. 2, 1988
[51] Int. Cl.⁴ .............................................. E06B 9/24
[52] U.S. Cl. ................................ 160/84.1; 160/370.2; 296/97.7; 493/405
[58] Field of Search ........................ 160/84.1, 370.2; 296/97 R, 97 E, 87; 493/405

[56] References Cited

U.S. PATENT DOCUMENTS 4,202,396 5/1980 Levy .................................... 160/84.1
4,775,180 10/1988 Phillips ......................... 160/370.2 X Primary Examiner—Blair M. Johnson
Attorney, Agent, or Firm—Robert C. Kain, Jr.

[57] ABSTRACT

The foldable automobile window shade generally includes a first plurality of substantially rigid, planar elements, joined together by hinges such that they form a first accordion fold portion of the shade, a second plurality of rigid, planar elements forming a second accordion fold portion of the shade. The shade also includes a hinge that links the first and second accordion fold portions. The single hinge links end elements of the first and second accordion fold portions. In a horizontal expansion mode, the first and second end elements have planar surfaces that are adjacent to each other and the first and second accordion fold portions extend outboard from either side of the adjacent end elements. In a vertically expandable mode, the end elements are co-planar with respect to each other. The first and second accordion fold portions are disposed above the respective first and second end elements and therefore the shade can be vertically expandable as desired to cover the interior of the automobile window.

18 Claims, 4 Drawing Sheets

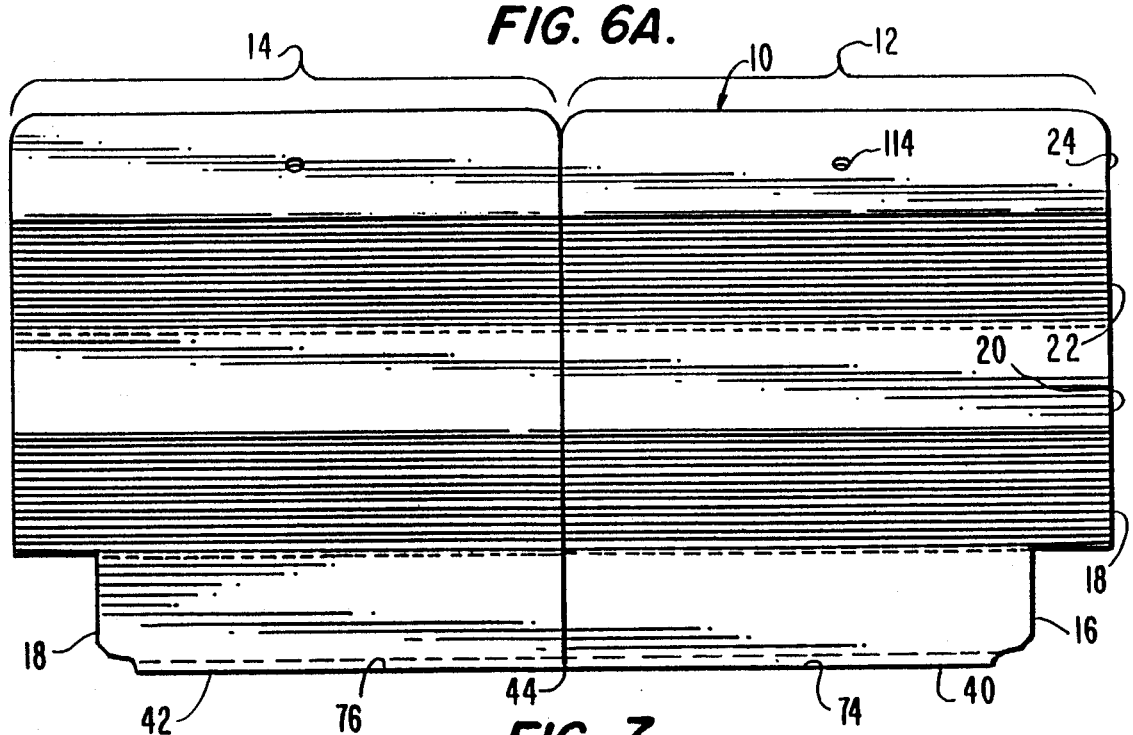
FIG. 6A.
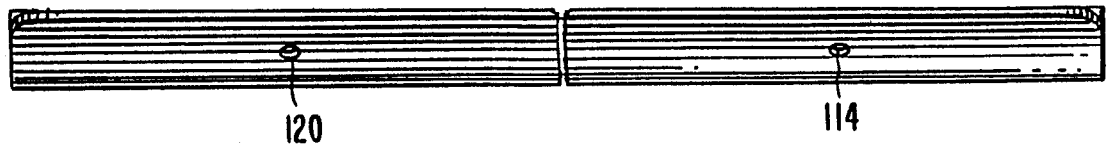
FIG. 7.
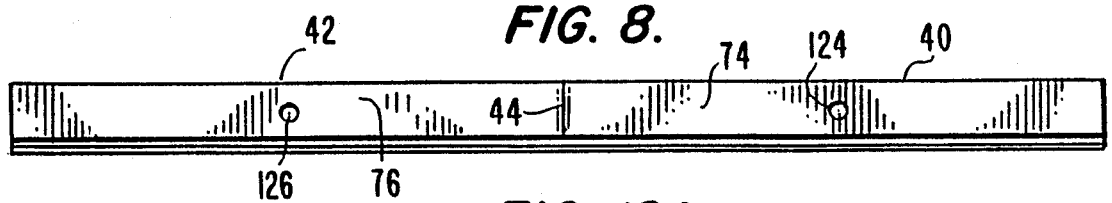
FIG. 8.
FIG. 10A.

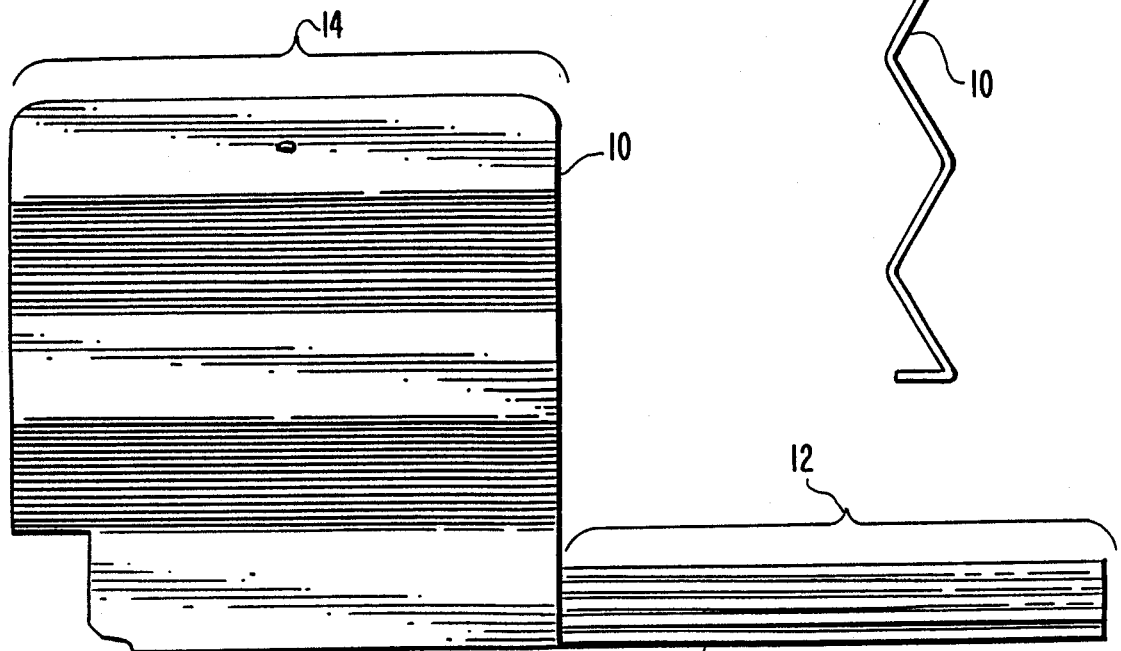
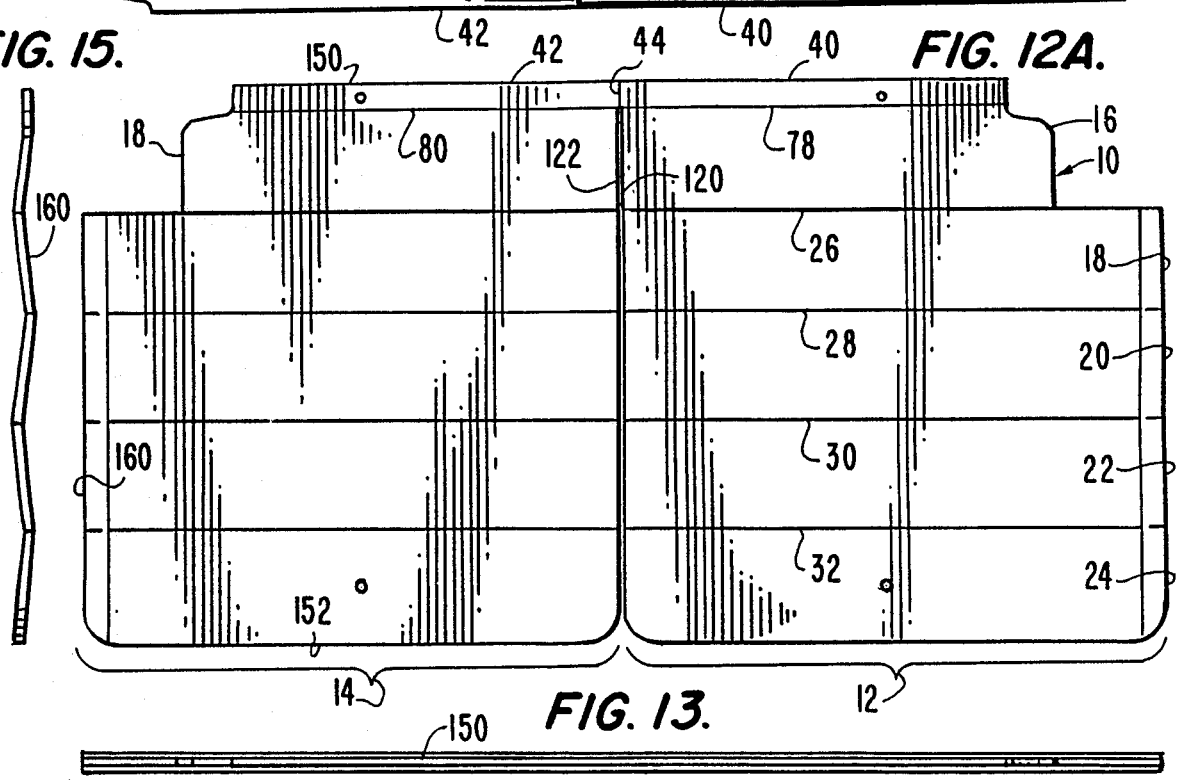

1

AUTOMOBILE WINDOW SHADE CONVERTIBLE TO HORIZONTAL EXPANSION OR VERTICAL EXPANSION

BACKGROUND OF THE INVENTION

The present invention relates to an automobile window shade and particularly to a shade that can be horizontally expanded to cover the front windshield and can be vertically expanded, in another mode, to cover the rear windshield.

When an automobile is sealed by closure of all of its windows, the temperature inside the automobile rises if sunlight enters the window and is converted into heat. In order to block a significant portion of this sunlight, foldable window shades have been developed. U.S. Pat. No. 4,202,396 to Levy discloses such a foldable sunshield or window shade for an automobile. The Levy sunshield is only horizontally expandable. As used herein, the term "horizontally expandable" refers to a sunshield that can b expanded such that its width is increased dependent upon the increasingly greater angles formed by the accordion folds of the shade. Also as used herein, the term "vertically expandable" refers to a shade whose height can be altered dependent upon the angle between the accordion folds.

OBJECTS OF THE INVENTION

It is an object of the present invention to provide a foldable automobile window shade that has two modes, a vertically expandable mode and a horizontally expandable mode.

It is another object of the present invention to provide an automobile window shade that is an integral structure.

It is a further object of the present invention to provide an automobile window shade that can be collapsed into a compact structure.

It is another object of the present invention to provide an automobile window shade wherein the shade can be configured in different modes in different automobile windows.

It is an additional object of the present invention to provide an automobile window shade that can be partially retracted in a vertical mode thereby blocking sunlight passing through a portion of the window, admitting sunlight through another portion of the window and enabling individuals in the automobile to see through that unblocked portion.

SUMMARY OF THE INVENTION

The foldable automobile window shade generally includes a first plurality of substantially rigid, planar elements joined together by hinges such that they form a first accordion fold portion of the shade. The shade also includes a second plurality of rigid, planar elements forming a second accordion fold portion of the shade. The shade also includes a hinge that links the first and second accordion fold portions. Preferably, the entire shade is made of cardboard and is an integral structure. The single hinge links end elements of the first and second accordion fold portions. In a horizontal expansion mode, the first and second end elements have planar surfaces that are adjacent to each other and the first and second accordion fold portions extend outboard from either side of the adjacent end elements. In a vertically expandable mode, the end elements are co-planar with respect to each other. The first and second accordion fold portions are disposed above the respective first and second end elements and therefore the shade can be vertically expandable as desired to cove the interior of the automobile window. Since the first and second accordion fold portions are substantially independent of each other, with the exception of the hinge linking the end elements, in the vertical expansion mode, the accordion fold portions can be operated separately such that only part of the window is shaded as compared with the other part of the window.

BRIEF DESCRIPTION OF THE DRAWINGS

Further objects and advantages of the present invention can be found in the detailed description of the preferred embodiment when taken in conjunction with the accompanying drawings in which:

FIG. 6A illustrates a front elevational view of the automobile window shade in the vertical expansion mode;

FIGS. 7 and 8 respectively illustrate top and bottom views of the automobile window shade in the vertical expansion mode;

FIG. 9 illustrates a side view of the automobile window shade in the vertical expansion mode from the perspective of section line 9'-9'' in FIG. 10A;

FIG. 10A illustrates a rear elevational view of the automobile window shade in the vertical expansion mode;

FIG. 11 illustrates a shade in a partially expanded and partially collapsed vertical mode;

FIG. 12A illustrates the automobile window shade in a substantially flattened and laid out position;

FIGS. 13, 14 and 15 illustrate, respectively, the upper side view, lower side view, and left side view of the automobile window shade in the substantially flattened and laid out position illustrated in FIG. 12A.

DETAILED DESCRIPTION OF THE PREFERRED EMBODIMENT

The present invention relates to an automobile window shade that is convertible to a vertically expandable mode and a horizontally expandable mode.

Figure 1A:
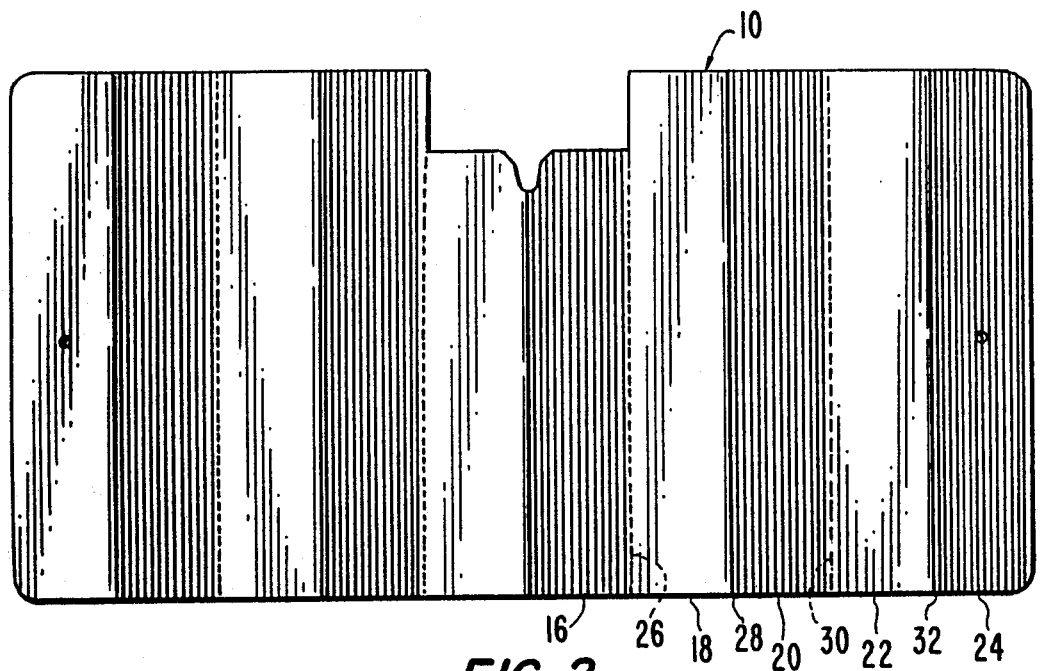
FIG. 1A illustrates a front elevation view of the automobile window shade in the horizontal expansion mode.
Figure 2:
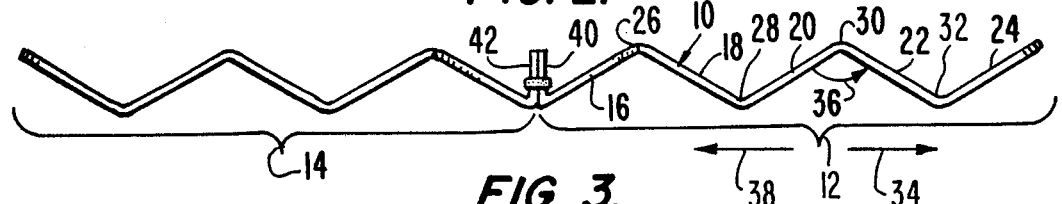
FIGS. 2 and 3 respectively illustrate a top view and a bottom view of the automobile window shade in the horizontal expansion mode.
Figure 3:
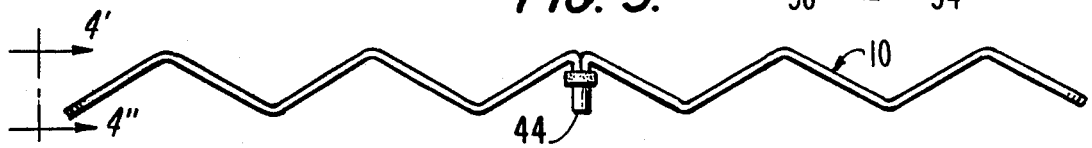
Figures 4, 5A:
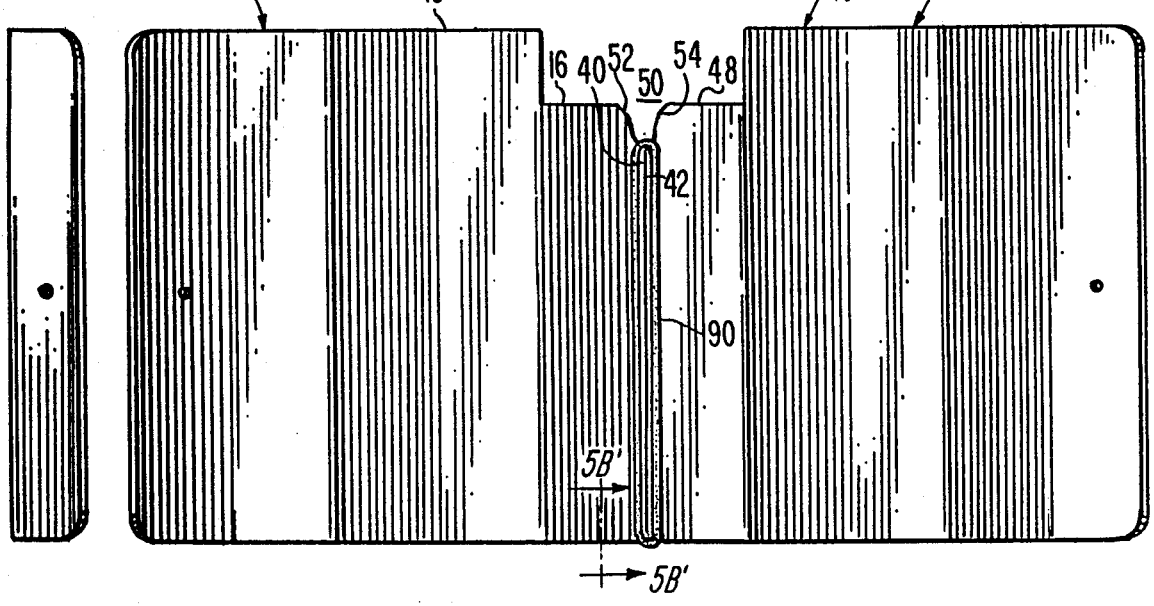
FIG. 4 illustrates a side view of of the automobile window shade in the horizontal expansion mode from the perspective of section line 4'-4'' in FIG. 3.
FIG. 5A illustrates a rear elevational view of the automobile window shade in the horizontal expansion mode.

FIGS. 1A, 1B, 2, 3, 4, 5A, 5B and 5C show window shade 10 in a horizontally expandable mode. FIGS. 1A and 5A show, respectively, the front and rear elevational views of window shade 10. Shade 10 includes a first accordion fold portion 12 and a second accordion fold portion 14 best illustrated in FIG. 2. Portion 12 includes rigid, planar elements 16, 18, 20, 22 and 24. These planar elements are joined together along longitudinal edges by accordion folds. In other words, planar elements 16 or 18 are joined along accordion fold 26; elements 18 or 20 are joined by fold 28; elements 20 and 22 are joined by fold 30; and elements 22 and 24 are joined by fold 32. These accordion folds enable portion 12 to be expanded in the direction of arrow 34, i.e., outboard from the center, by increasing the angle 36, which is called herein the "accordion angle". Accordion fold portion 12 can be collapsed by decreasing angle 36 by moving the elements in the direction of arrow 38.

Accordion fold portion 12 also includes planar end element 40. Accordion fold portion 14 includes a plurality of rigid, planar elements and an end element 42. End elements 40 and 42 are joined together by single, modal hinge 44 which is illustrated in the bottom view of shade 10 in FIG. 3.

FIG. 5A illustrates the rear elevational view of the window shade in the first or horizontally expandable mode. End elements 40 and 42 and adjacent elements 16 and 48 have a length that is less than the length of the remaining elements, such as element 18, in their respective accordion fold portions 12 and 14. The shorter length of elements 16 and 48 form a cutout 50. Additionally, the inboard edges 52 and 54 of elements 16 and 48 are further trimmed to define nose cutout 52.

Figure 1B:
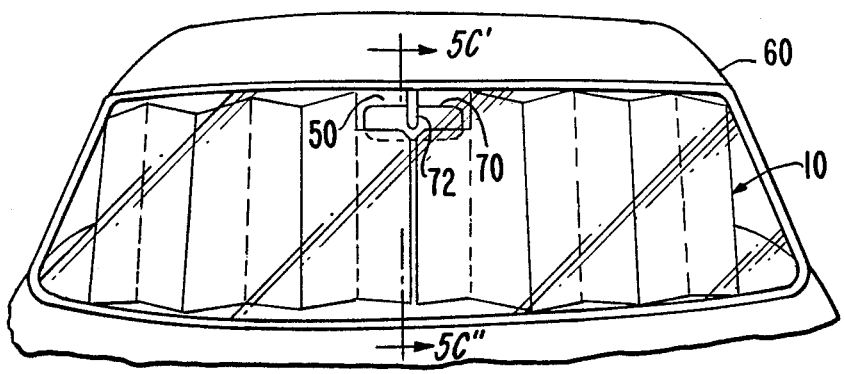
FIG. 1B illustrates a perspective view of the automobile window shade in the horizontal expansion mode shading the interior of the front window of an automobile.

FIG. 1B illustrates foldable window shade 10 disposed in the interior of an automobile 60. Shade 10 includes seven planar elements inclusive of the end planar element, one of which is end element 62 shown in FIG. 5C. FIG. 5C is a cross-sectional view of the window shade from the perspective of section line 5C'-5C" in FIG. 1B. Rear view mirror 70 is disposed in cutout 50 of window shade 10 and the nose portion of the cutout is close to stem 72 of rear view mirror 70.

Figure 5B:
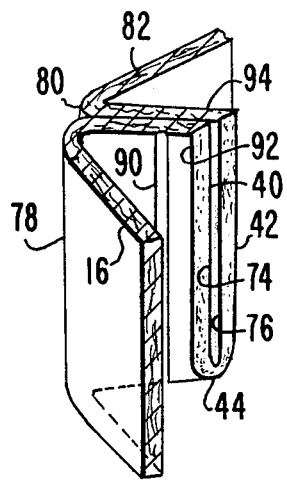
FIG. 5B illustrates a detail view of the modal hinge of the automobile window shade from the perspective of section line 5B, in FIG. 5A
Figure 5C:
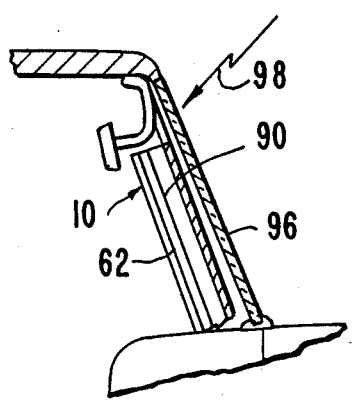
FIG. 5C illustrates a cross-sectional view of the automobile window shade in the horizontal expansion mode when the shade is placed behind the front window of an automobile.

FIG. 5B illustrates a detail perspective view of the bottom region of the adjacent end elements from the perspective of section line 5B' in FIG. 5A. End elements 40 and 42 have planar surfaces 74 and 76, respectively. These planar surfaces are adjacent each other when the window shade is in the horizontally expandable mode. Elements 40 and 42 have longitudinal edges that are joined, via accordion hinges 78 and 80, to elements 16 and 82, respectively. End elements 40 and 42 are joined together via a single modal hinge 44. Hinge 44 enables the shade to be converted into different modes, hence the term "modal hinge".

In a preferred embodiment, window shade 10 is an integral structure made of a cardboard material. Therefore, elements 40 and 42 are part of a common element that is associated with the first accordion fold portion 12 and the second accordion fold portion 14.

In order to keep the planar surfaces 74 and 76 closely adjacent, a means for biasing, in this embodiment a rubberband 90, encircles the outboard surfaces 92 and 94 of end elements 40 and 42. Rubberband 90 could be replaced by a coil spring or any other attachment mechanism such that surfaces 74 and 76 are brought adjacent each other. This could include snaps, velcro or any other type of easily removable attachment mechanism.

In FIG. 5C, window shade 10 is illustrated as being close to the interior surface of windshield 96. Sunlight, shown by arrow 98, would pass through window 96 but would be reflected or deflected by window shade 10. The inward protrusion of end elements 40 and 42 provide a stand such that in the horizontally expandable mode, the window shade stands upright and supports itself.

FIGS. 6A, 6B, 7, 8, 9, 10A, 10B and 10C show shade 10 in the second or vertically expandable mode. An important feature of the invention is the modal hinge 44 that enables the window shade to be converted from the horizontal mode to the vertical mode. In the vertical mode, end elements 40 and 42 are substantially co-planar with respect to each other. See, for example, FIGS. 8, 9 and 10B. Therefore, in order to convert the shade from the horizontal to the vertical mode, planar surfaces 74 and 76 are moved apart until end elements 40 and 42 are generally co-planar. In the vertical mode, elements 16, 18, 20, 22 and 24 of accordion fold portion 12 are disposed above end element 40. The same is true with respect to accordion fold portion 14 and end element 41; element 18 is disposed above end element 42 in FIG. 6A.

Figure 6B:
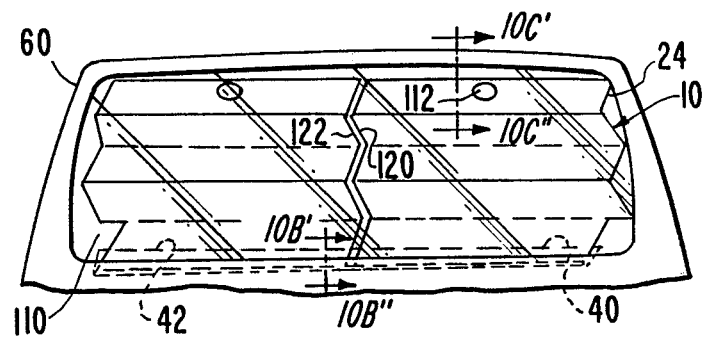
FIG. 6B illustrates the automobile window shade in the vertical expansion mode when the shade is placed in the rear window of an automobile.
Figure 10C:
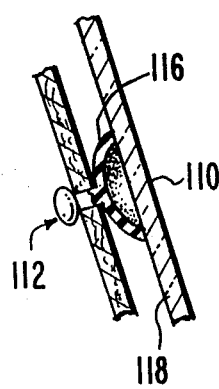
FIG. 10C illustrates a detail, cross-sectional view of the mounting mechanism for the automobile window shade in the vertical expansion mode from the perspective of section line 10C' in FIG. 6B.

FIG. 6B illustrates window shade 10 blocking the interior surface of rear windshield 110 of automobile 60. In order to attach element 24, the element remote from end element 40, to rear windshield 110, the shade includes a mounting means 112. Mounting means 112 extends through hole 114, shown in FIG. 6A, in element 24. A detailed, cross-sectional view of one type of mounting means 112 is shown in FIG. 10C. In this embodiment, mounting means 112 is a suction cup 116 that attaches to the interior surface 118 of window 110. Other mountings could be utilized. For example, element 24 could be connected via a velcro attachment to the interior liner of the automobile. Alternatively, a hook and eye combination could be utilized with respect to the window (using a suction cup) or with respect to the interior roof of the automobile.

FIGS. 7 and 8, respectively, illustrate the top and bottom views of window shade 10. FIG. 7 shows that hole 114 and hole 120 are available for mounting the elements most remote from end elements 40 and 42. FIG. 8 illustrates the commonality between elements 40 and 42 via modal hinge 44. End elements 40 and 42 also include mounting holes 124 and 126 which enable these end elements to be secured to the rear dashboard below rear window 110.

FIG. 10A illustrates a rear elevational view of shade 10 in the vertically expandable mode. The separated cutout sections 50a and 50b do not present a significant problem in blocking light entering through rear window 110 shown in FIG. 6B due to their low position in the shade.

FIG. 9 illustrates side view of shade 10 from the perspective of section line 9'-9" in FIG. 10A.

Figure 10B:
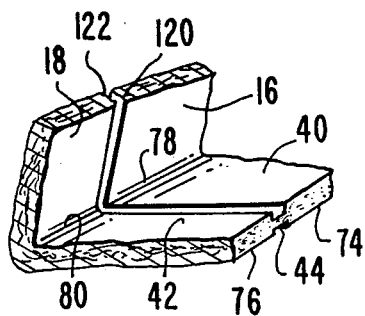
FIG. 10B illustrates a detail, perspective view of the modal hinge when the shade is in the vertical expansion mode from the perspective of section line 10B' in FIG. 6B.

FIG. 10B illustrates a detail, perspective view of modal hinge 44 from the perspective of section line 10B' in FIG. 6B. FIG. 10B shows that end elements 40 and 42 are co-planar. Adjoining elements 16 and 18 extend above end elements 40 and 42 due to accordion folds 78 and 80. In the vertically expandable mode, edges 120 of accordion fold portion 12 and edges 122 of accordion fold portion 4 (see FIGS. 6B and 10B) are closely adjacent to each other.

FIG. 11 shows that window shade 10 can be partially collapsed in the vertical expansion mode. In FIG. 11, accordion fold portion 12 has been collapsed on top of end element 40 but accordion fold portion 14 is still vertically expanded above end element 42. This capability of the shade enables the automobile driver to have limited vision out of the rear window and yet still block or screen a significant portion of the sunlight entering the window.

Figure 12B:
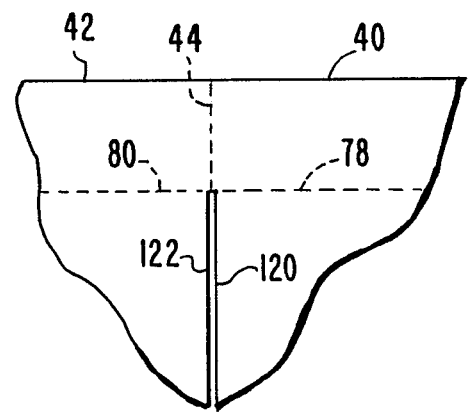
FIG. 12B illustrates a detail view of the modal hinge.

FIGS. 12A, 12B, 13, 14 and 15 illustrate various views of window shade 10 in a substantially flat and laid out position. Elements 40 and 42 are shown as being common and being joined by modal hinge 44. FIG. 12B is a detail view of modal hinge 44. Modal hinge 44 is shown by dashed lines, as are accordion folds 78 and 80. FIGS. 13, 14 and 15, respectively, show upper edge 150, lower edge 152 and side edge 160 of the substantially flat and laid out views of shade 10. In one embodiment, a sheet of cardboard is cut to form accordion fold portion 12 and accordion fold portion 14, thereby forming edge 122 and edge 120. The common element consisting of end elements 40 and 42 and modal hinge 44 is not cut. See FIG. 12B for a detailed view. Fold lines are placed in the cardboard to achieve accordion folds 78, 26, 28, 30, 32 in fold portion 12, as well as accordion fold 80 and the other unnumbered folds in fold portion 14.

Preferably, the shade is made of a cardboard material. However, it is possible to make the shade of a plastic or other lightweight material. The hinges, both modal hinge 44 and the accordion hinges, may be integral or may be a separate structure.

The claims appended hereto are meant to cover modifications and changes within the spirit and scope of the present invention.

What is claimed is:

1. A foldable window shade for an automobile comprising:
   a first plurality of substantially rigid, planar elements joined together by hinges along adjoining edges such that said first plurality of elements form a first accordion fold portion;
   a second plurality of substantially rigid, planar elements joined together by hinges along adjoining edges such that said second plurality of elements form a second accordion fold portion;
   a further hinge linking one of said first plurality of elements and one of said second plurality of elements along adjoining edges normal to accordion folds in said first and second accordion fold portions.

2. A foldable window shade as claimed in claim 1 wherein said one of said first plurality of elements is a first end element, said one of said second plurality of elements is a second end element, said first end element joined, via a first accordion hinge, to another element of said first plurality along a longitudinal edge, said second end element joined, via a second accordion hinge, to another element of said second plurality along a longitudinal edge, said single hinge located along abutting edges of said first and second end elements that is normal to said longitudinal edges.

3. A foldable window shade as claimed in claim 2 wherein in a first mode, said first and second end elements have planar surfaces adjacent each other and said first and second accordion fold portions are extendable horizontally with the adjacent planar surfaces being located intermediate said first and second accordion fold portions.

4. A foldable window shade as claimed in claim 3 wherein in a second mode, said first and second end elements are coplanar and said first and second accordion fold portions are disposed substantially above the respective first and second end elements such that the portions are extendable vertically with respect to said first and second end elements.

5. A foldable window shade as claimed in claim 3 including a means for bringing said planar surfaces of first and second end elements together.

6. A foldable window shade as claimed in claim 5 wherein said resilient means for bringing is a rubber band.

7. A foldable window shade as claimed in claim 4 including first means for mounting an opposing first end element of said first plurality opposite said first end element onto an interior surface of said window and including second means for mounting an opposing second end element of said second plurality opposite said second end element onto an interior surface of said window.

8. A foldable window shade for an automobile comprising:
   a first accordion fold portion defined by rigid, planar elements which are hinged together;
   a second accordion fold portion defined by rigid, planar elements which are hinged together;
   a common element having a first section that is part of said first accordion fold portion and having a second section that is part of said second accordion fold portion, said first and second sections separated by a hinge section that is normal to accordion fold lines of said first and second accordion fold portions.

9. A foldable window shade as claimed in claim 8 wherein in a first mode, said first and second sections have planar surfaces disposed adjacent each other and said first and second accordion fold portions are extendable horizontally with the adjacent planar surfaces being located intermediate said first and second accordion fold portions.

10. A foldable window shade as claimed in claim 9 wherein in a second mode, said first and second sections are coplanar with respect to each other and said first and second accordion fold portions are disposed substantially above the respective first and second sections such that the portions are extendable vertically with respect to said first and second sections.

11. A foldable window shade for an automobile comprising:
   a first accordion fold portion defined by rigid, planar elements which are hinged together;
   a second accordion fold portion defined by rigid, planar elements which are hinged together; pl a modal hinge linking a respective element of said first and second accordion fold portions together, said modal hinge permitting, in a first linking arrangement mode of operation, horizontal expansion of said first and second accordion fold portions and, in a second linking arrangement mode, vertical expansion of said first and second accordion fold portions wherein said first and second accordion fold portions are horizontally displaced with respect to each other in said second mode.

12. A foldable window shade as claimed in claim 11 wherein the respective elements of said first and second accordion fold portions are layered atop each other in a first mode and are coplanar in said second mode.

13. A foldable window shade as claimed in claim 1 wherein said first and second plurality of elements and said single hinge are integral.

14. A foldable window shade as claimed in claim 13 wherein said first and second plurality of elements and said single hinge are made of a cardboard material.

15. A foldable window shade as claimed in claim 8 wherein said first and second plurality of elements and said single hinge are integral.

16. A foldable window shade as claimed in claim 15 wherein said first and second plurality of elements and said single hinge are made of a cardboard material.

17. A foldable window shade as claimed in claim 13 wherein said first and second plurality of elements and said single hinge are integral.

18. A foldable window shade as claimed in claim 14 wherein said first and second plurality of elements and said single hinge are made of a cardboard material.

* * * * *